United States Patent [19]

Macedo

[11] Patent Number: 5,400,610
[45] Date of Patent: Mar. 28, 1995

[54] PORTABLE INSULATED CONTAINER WITH TEMPERATURE INDICATOR

[75] Inventor: Antone Macedo, Manville, R.I.

[73] Assignee: ERO Industries, Inc., Mt. Prospect, Ill.

[21] Appl. No.: 199,494

[22] Filed: Feb. 22, 1994

[51] Int. Cl.⁶ .......................................... G01K 13/00
[52] U.S. Cl. ................................. 62/130; 62/457.2; 62/457.7; 220/412; 340/585; 116/216
[58] Field of Search ................ 62/125, 129, 130, 371, 62/372, 530, 457.1, 457.2, 457.7; 165/918, 919, 11.1; 236/94; 220/412; 116/216, 221; 340/585, 586; 374/141

[56] References Cited

U.S. PATENT DOCUMENTS

| | | |
|---|---|---|
| 1,451,917 | 4/1923 | Meyer ................................... 62/130 |
| 1,535,536 | 4/1925 | MacDonald . |
| 2,460,215 | 1/1949 | Chase . |
| 2,953,921 | 9/1960 | Muncheryan . |
| 3,695,903 | 10/1972 | Telkes et al. . |
| 4,003,709 | 1/1977 | Eaton et al. . |
| 4,024,731 | 5/1977 | Branscum . |
| 4,050,264 | 9/1977 | Tanaka . |
| 4,057,029 | 11/1977 | Seiter . |
| 4,065,336 | 12/1977 | Conklin . |
| 4,140,016 | 2/1979 | Fergason . |
| 4,161,557 | 7/1979 | Suzuki et al. . |
| 4,179,397 | 12/1979 | Rohowetz et al. . |
| 4,213,310 | 7/1980 | Buss . |
| 4,285,697 | 8/1981 | Neary . |
| 4,319,629 | 3/1982 | Hotta . |
| 4,325,254 | 4/1982 | Svacina et al. . |
| 4,336,883 | 7/1982 | Krug et al. . |
| 4,351,385 | 9/1982 | Amey . |
| 4,364,234 | 12/1982 | Reed .................................. 62/130 X |
| 4,499,998 | 2/1985 | Carlson .............................. 206/541 |
| 4,767,039 | 8/1988 | Jacober .............................. 224/151 |
| 4,984,662 | 1/1991 | Jacober .............................. 190/107 |
| 5,000,581 | 3/1991 | Yata et al. ........................ 340/586 X |
| 5,040,678 | 8/1991 | Lenmark, Sr. et al. ............ 206/443 |
| 5,111,664 | 5/1992 | Yang ................................... 62/3.62 |
| 5,181,612 | 1/1993 | Liu ..................................... 206/546 |

Primary Examiner—Harry B. Tanner
Attorney, Agent, or Firm—Lockwood Alex Fitzgibbon & Cummings

[57] ABSTRACT

A portable insulated container is provided including a plurality of panels which define a formed body having a mouth opening opposite the bottom of the body. A cover member is also provided for selectively opening and closing the mouth opening. A temperature indicating assembly including a visually perceptible indicator in direct communication with a heat source/cold source disposed within the container is also provided to allow an individual to determine the relative temperature of the contents of the container without the necessity for opening the cover member.

46 Claims, 2 Drawing Sheets

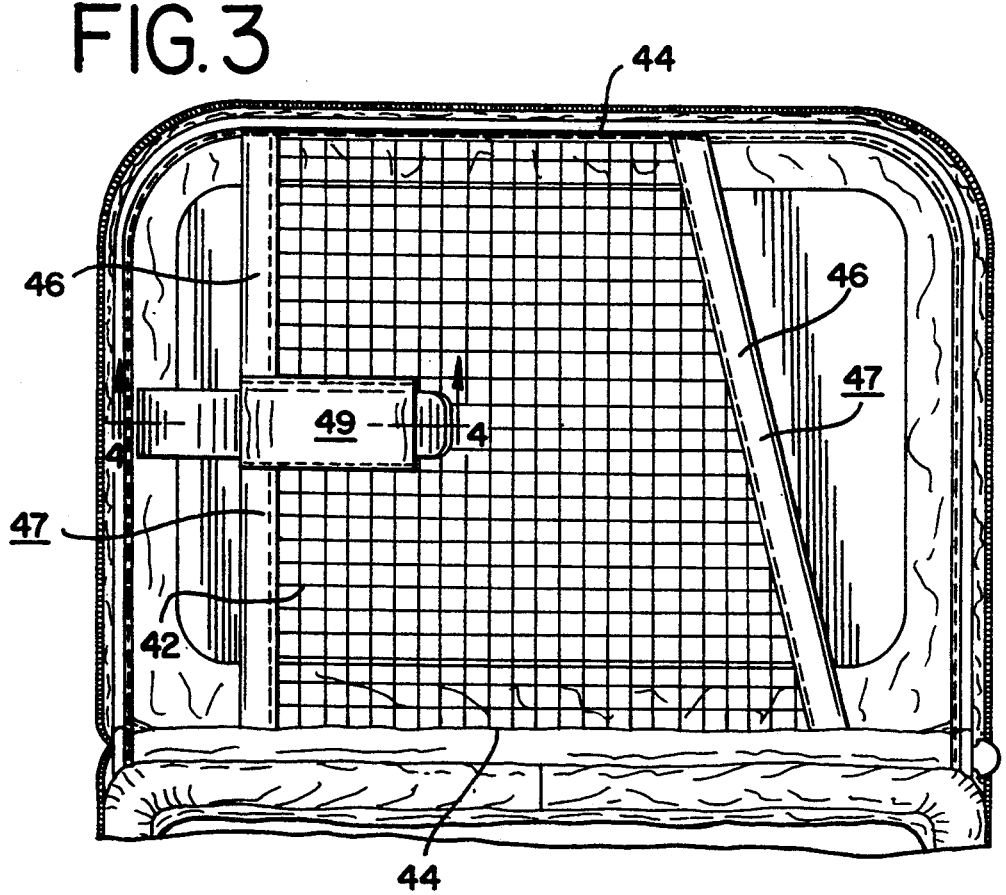
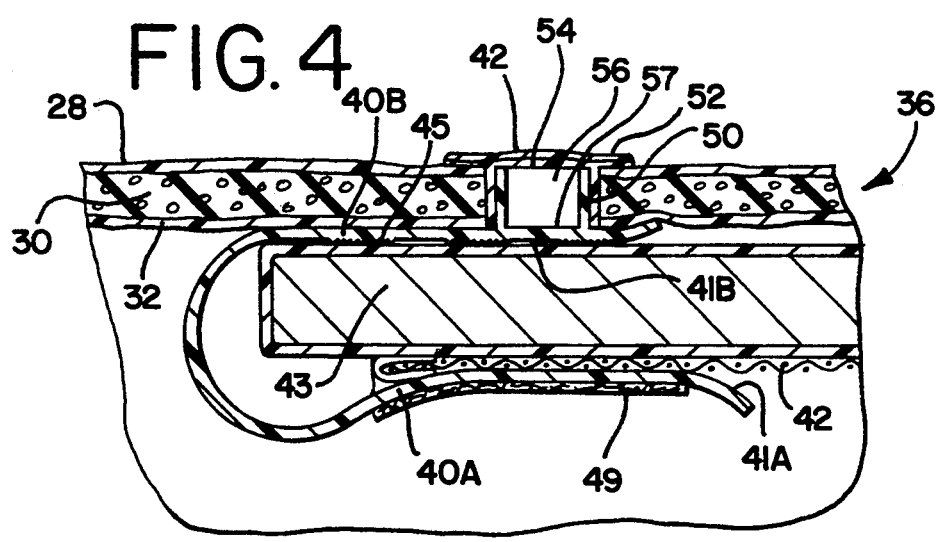

PORTABLE INSULATED CONTAINER WITH TEMPERATURE INDICATOR

PORTABLE INSULATED CONTAINER WITH TEMPERATURE INDICATOR

The present invention relates to portable insulated containers for keeping food products at desired temperature levels, and more particularly to a portable insulated container with a temperature indicating mechanism which is responsive to the relative temperature within the interior of the container without the need for exposing the contents of the container to ambient conditions.

BACKGROUND AND SUMMARY OF THE INVENTION

Portable insulated containers for carrying various items are well known, and are commonly referred to as "coolers" when utilized to maintain the contents at a relatively cold temperature. These containers are available in a variety of sizes and are most frequently used for maintaining food and beverages at cold temperatures. The food and beverages are generally maintained at the cold temperatures by packing the contents in the container together with a supply of ice or commercially available "freezer bricks."

Prior art insulated containers generally include a handle so that a single individual can easily transport the portable container and its contents. Larger portable containers can include two handles that two individuals can share the burden of carrying the container. Products carried in these containers are maintained at their desired temperatures by the transfer of heat energy between the ice and the products, while the insulated walls of the container limit the transfer of heat between the interior of the container and the atmosphere. Prior art portable insulated containers come in soft-walled and/or rigid-walled construction versions.

Although improvements in the insulating properties of insulating materials used in the construction of insulated containers, have extended the length of time that a desirable temperature level can be maintained under given environmental conditions, even the best of insulators will not prevent gradual change in internal container temperature after the insulated container is packed with products and coolant. It is therefore incumbent upon the individual user to check the container to insure that the contents are being maintained at the proper temperature. Typical insulator containers can be checked only by gaining access to the inside of the container. Constant opening and closing of the insulated container is time consuming, burdensome and extremely inefficient as it exposes the contents to ambient conditions which are usually widely disparate from the desired temperature level. In addition, the insulated container may be packed in tight or cramped conditions making it difficult to remove the lid or otherwise open the container in order to check the interior conditions.

Accordingly, it is a general object of the present invention to provide a portable insulated container that accesses the interior with a temperature indicating assembly for determining the relative temperature of the interior without the necessity of opening the container.

Another object of the present invention is to provide a portable insulated container having pliable end panels, side panels, bottom panels and a pliable cover for closing an opening to the interior of the container and having a temperature indicating assembly for determining the relative temperature of the interior without the necessity of removing the cover.

Yet another object of the present invention is to provide a portable insulated container having a temperature indicating assembly that utilizes temperature sensitive material that undergoes a color change or color intensity change at a predetermined temperature to indicate the relative temperature of the interior of the container.

Still another object of the present invention is to provide a portable insulated container having a temperature indicating assembly that is visually perceptible to an individual for indicating the relative temperature of the interior of the container without the necessity of gaining access to the interior.

In accordance with these and other objects, the present invention, in its broadest aspects provides a portable insulated container with temperature indicating capabilities. The container comprises a plurality of panels including a bottom panel, a pair of side panels and a pair of end panels which define a compartment having an inner body cavity with a cavity opening opposite the bottom panel. The container further includes an end cover for selectively opening and closing the cavity opening. The end cover typically is joined to the body of the container by an attachment assembly which selectively joins or disjoins less than the full rectangular periphery of the cover. A temperature indicating assembly is provided, typically being mounted on the cover member, for indicating the relative temperature of the inner body cavity by observing the temperature indicating assembly from the outside of the container. The indicator assembly includes a visually perceptible indicator that can be viewed from outside the container and which is in thermal communication with a source of cooling or heating energy that is disposed within the insulated container.

Preferably, the insulated container is of the soft-walled variety in which one or more of the panels, is made from pliable material. Typically soft-walled containers include an outside layer of woven material, an inside layer of waterproof material and an insulating material intermediate the outside layer and the inside layer. In addition, the visually perceptible indicator is provided with thermochromatic material which undergoes a color change or a change in color intensity or character in a predetermined temperature range.

These and other objects of the present invention will be apparent from the following description, taken in conjunction with the accompanying drawings.

BRIEF DESCRIPTION OF THE DRAWINGS

FIG. 3 is an inside elevational view of a cover member of an illustrated container made according to the present invention illustrating the heat source/cold source holding compartment and probe assembly; and FIG. 4 is a cross sectional view taken along line 4—4 of FIG. 3 illustrating the temperature indicating assembly disposed in an insulated container made according to the present invention.

DETAILED DESCRIPTION OF THE PREFERRED EMBODIMENT

Figure 1:
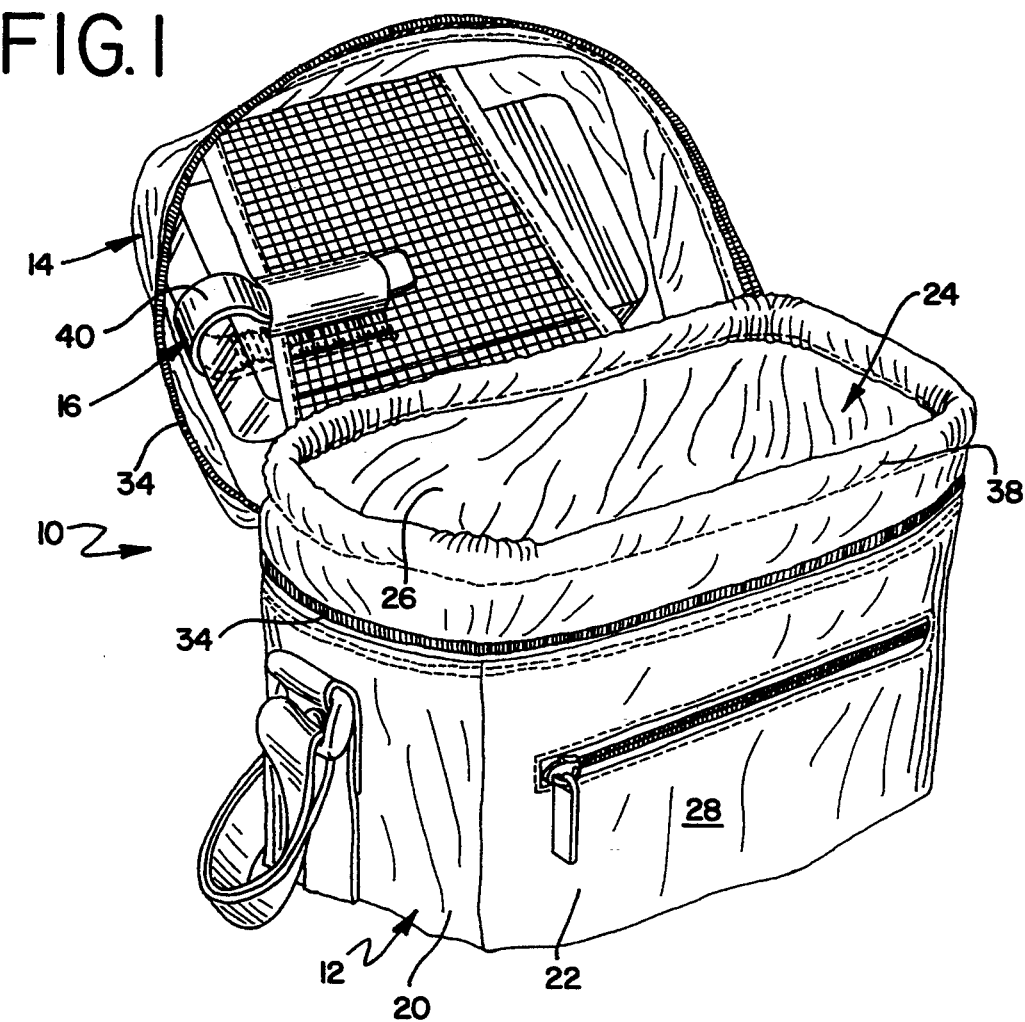
FIG. 1 is a front perspective view of a portion of an insulated container made according to the present invention illustrating the cover member in an open position.
Figure 2:
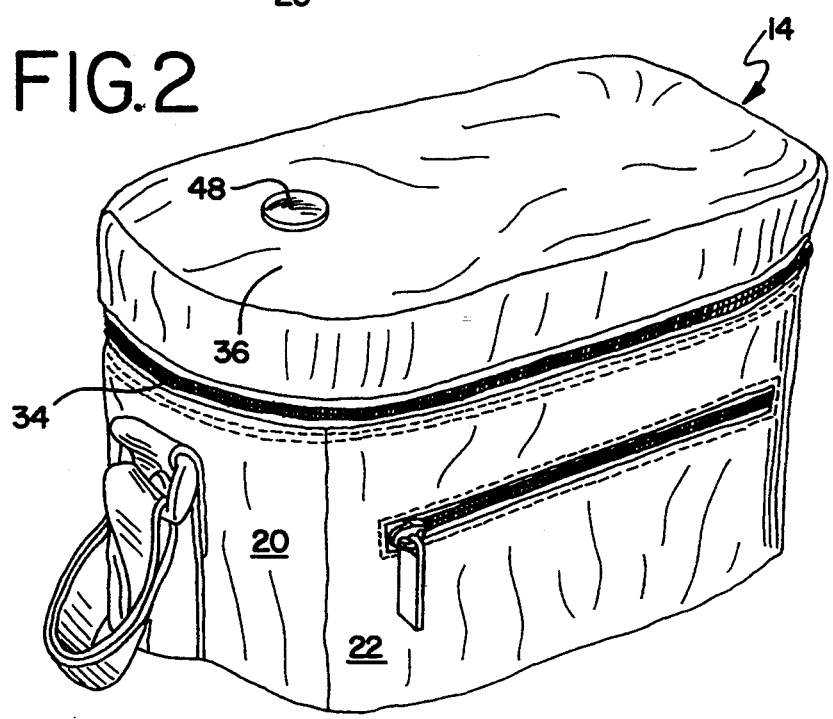
FIG. 2 is a front perspective view of a portion of an insulated container made according to the present invention illustrating the cover member in a closed position.

As illustrated in the drawings, the portable insulated container generally designated at 10 and made according to the present invention comprises a body portion 12, a cover member 14 and a temperature indicating assembly 16. In this illustrated embodiment, the temperature indicating assembly is located on the cover member, and other locations are possible depending upon the particular design of the container.

Body portion 12 comprises a plurality of panels including a bottom panel (not shown), a pair of side panels 20 and a pair of end panels 22. These panels either are joined together at their respective edges to form the body portion, or they are a generally unitary in construction. It is also possible, in the case of multi-layered construction, for one or more of the components to be of unitary construction while one or more other components are multi-component.

In the preferred embodiment illustrated, the insulated container is generally non-rigid, and the panels are multi-layered. Preferably, the outside layer 28 is a synthetic or natural woven fabric that is both durable and attractive, such as a nylon, polyvinylchloride, a polyurethane, cotton, canvas or the like. An insulator sheet 30 is positioned thereunder and made of a light-weight thermally insulative material such as a polyolefin, for example polyethylene, a foamed polyurethane, or the like, the insulator sheet 30 often being somewhat porous. Innermost layer 32 is preferably made of a water resistant material such as a sheet of a polyolefin, polyvinylchloride, or the like.

This structure provides a body portion 12 that has an outside skin or layer 28 that is both durable and attractive and an inside skin or layer 32 that is resistant to damage by moist, cold or warm items. Such a structure also provides a wall or insulator sheet 30 that is relatively thin yet possesses adequate insulating properties, which insulative sheet 30 is protected from moisture by the inside skin or layer 32.

Alternatively, the body portion 12 may be molded from a polymer that forms a hard, rigid plastic shell. An insulative sheet of material similar to those described above may be disposed between an inner skin of the hard plastic and an outer skin.

Insulated container 10 includes a mouth 26 through which access may be gained to the interior body cavity 24. A cover member 14 is included for selectively opening and closing mouth 26. In the illustrated embodiment, a closure assembly 34, such as the illustrated zipper, is provided for selectively opening and closing mouth 26 in a manner such that the mouth 26 is completely closed by cover member 14. Preferably, cover member 34 has a preselected height between closure assembly 34 and its outside end 36, which height is adequate to have cover 14 accommodate and enclose a lip 38 that extends beyond the closure assembly 34 on the insulated container 10. Typically, the lip 38 extends from body portion 12 of insulated container.

While the illustrated closure assembly 34 is in the form of a zipper, other structures may be suitable. Examples include flaps and/or straps having ties or buckles, or the like, or snaps or hook-and-loop fasteners such as Velcro ® fasteners and the like.

Insulated container 10 also includes an interior compartment temperature level indicating assembly 16. The assembly 16 includes a retaining member for securing a block or the like in place within the insulated container. This block is a cold source or a heat source. An example of a suitable cold source is a block which can be frozen and then secured in place to assist in maintaining a lowered or cool temperature within the container, such as a temperature suitable for storing food and/or drink. In an important aspect of the retaining member, it secures the block into place within the container such that the block is in heat-transmitting contact with a temperature level indicator 48. Generally, the indicator can be said to monitor temperature changes of the block.

Illustrated retaining member 40 has two spaced-apart arms 40A and 40B having opposed faces 41A and 41B, biased together and adapted to pinch a heat source/cold source block 43. Opposing face 41B preferably is provided with ribbed surfaces 45 to assist in holding the heat source/cold source block. A webbing 42, which may be made from any suitable material such as polyvinylchloride, is provided to assist in holding the block 43 in the cover member 14, or other wall of the container. Webbing 42 is connected, such as by stitching, along opposite edges 44 to the inside of cover member 14. The two remaining opposite edges 46, which can include binding 47, remain unconnected and provide ingress and egress to an area intermediate the cover member and the webbing 42, such area being adapted to receive the block 43. In addition, arm 40A of the retainer member 40 preferably is positioned in a sleeve 49 to assist in retaining the arm 40A and the heat source/cold source block in place. The illustrated sleeve 48 is formed adjacent to one edge of the webbing 42.

Retaining member 40 is preferably made from a thermally conductive polymer, such as polyethylene or the like and is in thermal communication with a visually perceptible indicator 48 protruding through the top end of the cover member. In the illustrated embodiment, the retaining member 40 and the indicator 48 are integrally connected together. They can be molded as one piece or secured together such as by energy welding, fasteners or adhesive material.

Indicator 48 which is shown has a generally cylindrically shaped body 50 extending through the top end 36 of cover member 14 and a circular rim 52 positioned on the top of cover member 14. Rim 52 is of a diameter greater than the diameter of body 50 and the hole through the top end 36 of cover member 14 to prevent the indicator from being pulled through the top end of cover member 14.

In general, the color change system is multi-layered and includes a background color material 42, a liquid crystal material 54 of a type described in greater detail below, air or vacuum space 56 and lens assembly 57. When the portable insulated container is utilized to keep material cold it operates as follows for certain types of crystal materials.

Prior to the insertion of a cold source into the retaining member of the insulated container, the liquid crystal material is clear and light reflects off the lens appearing to an observer as the color of the background material, preferably an iridescent red or yellow color to indicate that the container is warm. The cold source is then inserted into the retaining member 40 and webbing 42 directly contacting the retaining member 40. The cold temperature of the cold source is communicated to the visually perceptible indicator via the thermally conductive retaining member causing the liquid crystal to become opaque and develop a color such as blue, denoting that the container is cool. As the cold source absorbs heat energy, and "melts," the liquid crystal will revert back to a clear state to indicate that the container is becoming warm. The color change back to clear or warm should occur when the cold source has attained a temperature in the range of 40° F. to 55° F., and preferably in the range of 47° F. to 50° F.

It should be understood that the cold source may be any material that generally has heat absorbing capacity such as, for example, a bag of ice, a commercially available refreezable self-contained liquid or freezer brick and the like.

When the portable insulated container of the present invention is utilized to keep its contents at an elevated temperature, the liquid crystal will remain clear at warmer temperatures allowing light to reflect off the lens and show an iridescent red or yellow color to denote the container is warm. As the temperature of the heat source drops, the liquid crystal becomes opaque indicating that the temperatures in the container has dropped below a desired range. One significant difference between the container functioning to maintain its contents at cool temperature and functioning to maintain its contents at relatively warm temperature is that the temperature range at which the liquid crystal undergoes a color change occurs is approximately between 110° F. and 130° F. when it is desired to maintain the contents at relatively warm temperatures.

A portable insulated container that utilizes a temperature sensitive material that undergoes a color change within both temperature ranges described above which allow the container to indicate changes in desired temperature ranges for both cold and warm products is part of the present invention. It should also be understood that the heat source may be any heat emitting material such as, for example, a self-contained re-energizable heat emitting material and the like.

Indicator 48 is provided with a thermochromatic substance or cholesteric liquid crystals that undergo a color change when heated or cooled to a predetermined temperature range. The various substances discussed in Suzuki et. al., U.S. Pat. No. 4,161,557, incorporated by reference hereto, are exemplary of the general type of temperature sensitive material utilized in the present invention. When material stored in the portable insulated container of the present invention is desired to be kept at a cool temperature, inks or material provided in the temperature indicator 48 should be provided that undergo color change in the range of 40° F. to 55° F., and preferably 47° F. to 50° F. With respect to material stored in the portable insulated container of the present invention desired to be maintained at a relatively warm temperature, it is believed that temperature sensitive inks or material that undergo a color change in the range of 115° F. to 130° F. would be most effective.

It should be understood that the change in color of the temperature sensitive ink typically is not permanent. In most versions of these containers, they are to be repeatedly used, and as such, the indicator 48 will often be heated between ambient temperatures and the desired hot or cold temperatures. In these instances, the color or appearance change system should be reversible.

An important aspect of the present invention is that the heat source/cold source block retainer member is provided in direct contact with the heat source/cold source block and is integral with the visually perceptible indicator and the temperature sensitive ink contained therein. This arrangement allows direct thermal communication between the heat source/cold source block and the visually perceptible temperature indicator and ink, insuring a more accurate reading of the relative temperature of the interior of the portable insulated container as reflected in the temperature of the block.

The present invention, in its preferred embodiment, is provided with an adjustable strap and buckle system of a type well known in the art, and may also be provided with a pair of handles for larger dimensioned containers.

It will thus be seen that the present invention provides a new and useful portable insulated container having a number of advantages and characteristics, including those pointed out herein and others which are inherent in the invention. A preferred embodiment of the invention has been described by way of example, and it is anticipated that modifications may be made to the described form without departing from the spirit of the invention or the scope of the appended claims.

What is claimed is:

1. A portable insulated container comprising:
  a plurality of panels, said panels including a bottom panel, side panels and end panels that define a shaped compartment having a body and a mouth opening, each of said panels having thermal insulative properties, said insulated container further including a cover member for selectively opening and closing said mouth opening, and a closure assembly for securing said cover member to said body of the insulated container; and
  a temperature level indicating assembly indicating the relative temperature of the interior of said container without the need for opening said cover member, said temperature level indicating assembly including a visually perceptible indicator mounted on said insulated container, said indicator assembly including a retainer member that maintains said visually perceptible indicator in direct thermal communication with a heat source/cold source member disposed within the insulated container.

2. The portable insulated container of claim 1, wherein said retainer member is thermally conductive and at least a portion thereof is connected between said heat source/cold source and said visually perceptible indicator for transferring heat therebetween.

3. The portable insulated container of claim 1, wherein said retainer member is integrally connected to said visually perceptible indicator.

4. The portable insulated container of claim 1, wherein said retainer member includes a first arm portion having a face portion and a second arm portion having a face portion, said face portions being spaced apart and opposed and adapted to engage said heat source/cold source member therebetween.

5. The portable insulated container of claim 4, wherein said first arm portion cooperates with a webbing for further maintaining said heat source/cold source in an upper interior section of said cover member.

6. The insulated container of claim 1, wherein said cover member includes at least one insulated panel.

7. The insulated container of claim 1, wherein said plurality of panels are multi-layered and include an outside layer of woven fabric, an inside layer of water resistant material, and an insulator sheet intermediate said outside layer and inside layer.

8. The insulated container of claim 1, wherein said cover member includes an outside end panel that is multi-layered and includes an outside layer of woven fabric, an inside layer of water resistant material and an insulator sheet intermediate said outside layer and inside layer, said closure assembly selectively joins or disjoins less than the full periphery of the cover member to the body of the insulated container, the remainder of said full periphery of the cover member being hingedly attached to said body of the insulated container.

9. The portable insulated container of claim 1, wherein said visually perceptible temperature indicator is multi-layered and includes a background color material, a thermochromatic ink, a vacuum space and a lens assembly.

10. The portable insulated container of claim 1, wherein said visually perceptible temperature indicator includes thermochromatic ink.

11. The portable insulated container of claim 1, wherein said visually perceptible temperature indicator includes cholesteric liquid crystal which undergoes a change in color between approximately 40° F. and 55° F.

12. The portable insulated container of claim 1, wherein said visually perceptible temperature indicator includes cholesteric liquid crystal which undergoes a change in color between approximately 45° F. and 50° F.

13. The portable insulated container of claim 9, wherein said thermochromatic ink undergoes a change in color between approximately 47° F. and 50° F.

14. The portable insulated container of claim 1, wherein said visually perceptible temperature indicator includes cholesteric liquid crystal which undergoes a change in color between approximately 110° F. and 130° F.

15. The portable insulated container of claim 1, wherein said visually perceptible temperature indicator includes cholesteric liquid crystal which undergoes a change in color between approximately 115° F. and 130° F.

16. The portable insulated container of claim 1, wherein said mouth opening is defined by an upstanding peripheral lip of a defined height.

17. The portable insulated container of claim 1, wherein said cover member includes a side wall extending the full periphery of the cover member, said side wall having a periphery larger than that of said peripheral lip so as to cover the outside surface of and overlap said peripheral lip.

18. The portable insulated container of claim 1, wherein said temperature level indicating assembly is mounted on said cover member, and said visually perceptible indicator is mounted through said cover member.

19. A portable insulated container comprising:
a plurality of walls defining a shaped compartment having a body, a mouth opening, and a closure for the mouth opening;
each of said walls having thermal insulative properties, said insulated container further including a body area adapted to hold a heat source/cold source block;
a temperature indicating assembly indicating the relative temperature of the interior of said container without the need for opening the container, said temperature indicating assembly including a retainer member and a visually perceptible indicator mounted to the container, said visually perceptible indicator is in direct thermal communication with said heat source/cold source block, and said retainer member maintains said heat source/cold source block in a relatively fixed position in said container and in said direct thermal communication.

20. The portable insulated container of claim 19, wherein said plurality of walls are rigid.

21. The portable insulated container of claim 19, wherein said plurality of walls are pliable.

22. The portable insulated container of claim 19, wherein said walls are pliable and multi-layered to include an outside layer of sheet material, an inside layer of sheet material and an insulator sheet intermediate of said outside sheet and said inside sheet.

23. The portable insulated container of claim 19, wherein said walls are pliable and multi-layered to include an outside layer of woven fabric, an inside layer of water resistant material, and an insulation layer intermediate said outside layer and said inside layer.

24. The portable insulated container of claim 19, wherein said walls are multi-layered and include an outside layer of substantially non-pliable material, an inside layer of substantially non-pliable material, and an insulator layer intermediate said outside layer and said inside layer.

25. The portable insulated container of claim 19, wherein said retainer member is thermally conductive and connected between said heat source/cold source block and said visually perceptive indicator for transferring heat therebetween.

26. The portable insulated container of claim 19, wherein said retainer member is integrally connected to said visually perceptible indicator.

27. The portable insulated container of claim 19, wherein said retainer member includes a first arm portion having a face portion and a second arm portion having a face portion, said face portions being spaced apart and opposed and adapted to engage a heat source/cold source block therebetween.

28. The portable insulated container of claim 27, wherein said first arm portion cooperates with a webbing for further maintaining said heat source/cold source block in an upper interior section of said cover member.

29. The portable insulated container of claim 19, wherein said visually perceptible temperature indicator is multi-layered and includes a background color material, a thermochromatic ink, a vacuum space and a lens assembly.

30. The portable insulated container of claim 19, wherein said visually perceptible temperature indicator includes thermochromatic ink.

31. The portable insulated container of claim 19, wherein said visually perceptible temperature indicator includes cholesteric liquid crystal which undergoes a change in color between approximately 40° F. and 55° F.

32. The portable insulated container of claim 19, wherein said visually perceptible temperature indicator includes cholesteric liquid crystal which undergoes a change in color between approximately 45° F. and 50° F.

33. The portable insulated container of claim 19, wherein said visually perceptible temperature indicator includes cholesteric liquid crystal which undergoes a change in color between approximately 47° F. and 50° F.

34. The portable insulated container of claim 19, wherein said visually perceptible temperature indicator includes cholesteric liquid crystal which undergoes a change in color between approximately 115° F. and 130° F.

35. The portable insulated container of claim 19, wherein said visually perceptible temperature indicator includes cholesteric liquid crystal which undergoes a change in color between approximately 120° F. and 130° F.

36. A portable insulated container comprising:
a plurality of pliable panels that define a shaped compartment having a body and a mouth opening, said mouth opening being defined by an upstanding peripheral lip of a defined height, each of said pliable panels having pliable thermal insulation means, said insulated container further including a cover member for selectively opening and closing said mouth opening;
closure means for securing said cover member to said body of the insulated container, said closure means selectively joining or disjoining less than the full periphery of the cover member of the body of the insulated container, the remainder of said full periphery of the cover member being hingedly attached to said body of the insulated container;
said cover member of the insulated container is pliable and has a side wall extending the full periphery of the cover member, said cover member has a multi-layered end panel that includes an outside layer of sheet material, an inside layer of sheet material and an insulator sheet that is thicker than and is intermediate of said outside sheet and said inside sheet, said body being defined between an outside edge of the cover member and said closure means, said body having a periphery larger than that of the peripheral lip so as to cover the outside surface of and overlap said peripheral lip, and said side wall of the cover member having a height approximating said defined height of said upstanding peripheral lip;
said upstanding peripheral lip projects above and extends beyond and outside of said closure means, and said side wall of the cover member generally overlies said upstanding peripheral lip when said cover member is in a closed orientation, whereby said cover member, once opened, will be engaged to interact with said closure assembly in order to allow the cover member to remain open and clear of the mouth opening; and,
a temperature level indicating assembly indicating the relative temperature of the interior of the compartment without the necessity of opening said cover member including a visually perceptible temperature indicator mounted on said cover member, said visually perceptible temperature indicator including a thermochromatic ink adapted to undergo a change in color at a predetermined temperature range, said visually perceptible indicator connected by a thermally conductive retainer to a heat source/cold source member, and disposed within said cover member, said visually perceptible temperature indicator measures the relative heat transfer to or from said heat source/cold source member, and said retainer member holds said visually perceptible temperature indicator in direct contact with said heat source/cold source member.

37. The portable insulated container of claim 36, wherein said visually perceptible temperature indicator is multi-layered and includes a background color material, a thermochromatic ink, a vacuum space and a lens assembly.

38. The portable insulated container of claim 36, wherein said visually perceptible temperature indicator includes thermochromatic ink.

39. The portable insulated container of claim 36, wherein said visually perceptible temperature indicator includes cholesteric liquid crystal which undergoes a change in color between approximately 40° F. and 55° F.

40. The portable insulated container of claim 36, wherein said visually perceptible temperature indicator includes cholesteric liquid crystal which undergoes a change in color between approximately 45° F. and 50° F.

41. The portable insulated container of claim 36, wherein said visually perceptible temperature indicator includes cholesteric liquid crystal which undergoes a change in color between approximately 47° F. and 50° F.

42. The portable insulated container of claim 36, wherein said visually perceptible temperature indicator includes cholesteric liquid crystal which undergoes a change in color between approximately 110° F. and 130° F.

43. The portable insulated container of claim 36, wherein said visually perceptible temperature indicator includes cholesteric liquid crystal which undergoes a change in color between approximately 115° F. and 130° F.

44. The portable insulated container of claim 36, wherein said retainer member is integrally connected to said visually perceptible indicator.

45. The portable insulated container of claim 36, wherein said retainer member includes a first arm portion having a face portion and a second arm portion having a face portion, said face portions being spaced apart and opposed and adapted to engage a heat source/cold source member therebetween.

46. The portable insulated container of claim 45, wherein said first arm portion cooperates with a webbing for further maintaining said heat source/cold source member in an upper interior section of said cover member.

* * * * *